(12) United States Patent
Petternella et al.

(10) Patent No.: US 7,133,728 B2
(45) Date of Patent: Nov. 7, 2006

(54) SINGLE-INPUT MULTI-OUTPUT CONTROL SYSTEM

(75) Inventors: Massimiliano Petternella, Grottaferrata (IT); Marco Tiberti, Rome (IT)

(73) Assignee: Universita Degli Studi Di Roma Tor Vergata (IT)

(*) Notice: Subject to any disclaimer, the term of this patent is extended or adjusted under 35 U.S.C. 154(b) by 294 days.

(21) Appl. No.: 10/487,098

(22) PCT Filed: Sep. 13, 2002

(86) PCT No.: PCT/IT02/00585

§ 371 (c)(1),
(2), (4) Date: Aug. 12, 2004

(87) PCT Pub. No.: WO03/025684

PCT Pub. Date: Mar. 27, 2003

(65) Prior Publication Data

US 2004/0254657 A1    Dec. 16, 2004

(30) Foreign Application Priority Data

Sep. 14, 2001 (IT) .......................... RM2001A0560

(51) Int. Cl.
*G05B 13/02* (2006.01)
*G06F 15/16* (2006.01)

(52) U.S. Cl. .............................. 700/53; 700/3; 709/208

(58) Field of Classification Search .................. 700/53, 700/3, 35, 45; 709/208; 331/615
See application file for complete search history.

(56) References Cited

U.S. PATENT DOCUMENTS

| | | | | |
|---|---|---|---|---|
| 4,907,146 | A * | 3/1990 | Caporali ..................... | 709/204 |
| 5,783,923 | A | 7/1998 | Wise | |
| 6,952,618 | B1 * | 10/2005 | Davlin et al. .................. | 700/3 |
| 6,956,463 | B1 * | 10/2005 | Crenella et al. ............... | 307/3 |
| 7,050,860 | B1 * | 5/2006 | Muneta et al. ................. | 700/3 |

OTHER PUBLICATIONS

Hong et al. "Variable Selection Algorithm for Contruction of MIMO Operating Point Dependent Neurofuzzy Networks", Feb. 2001, IEEE Trans on Fuzzy Systems, vol. 9 No. 1, pp. 88-101.*
"Single Master-Multiple Slaves Manipulator with Penalty Inveriance"; Petternella, M., et al.; R.REPORT, Mar. 1976; pp. 265-272, Figures 1-3.

* cited by examiner

*Primary Examiner*—Thomas Pham
(74) *Attorney, Agent, or Firm*—Dickstein, Shapiro, LLP.

(57) ABSTRACT

A single-input multi-output control system particularly useful to equally distributing the noise effects and/or the parametric variations among the multiple outputs, comprising two or more control sub-systems, each of said two or more control sub-systems having a corresponding error node ($Ne_i$) and an output ($Y_i$) coincident with one of said multiple outputs, and an auxiliary node (Nc) adapted to connect said error nodes ($Ne_i$) with one another.

20 Claims, 7 Drawing Sheets

SINGLE-INPUT MULTI-OUTPUT CONTROL SYSTEM

This invention relates to a single-input multi-output control system, particularly useful to obtain an equal distribution of the noise effects and of parametric variations among the outputs.

In designing machines, often the need arises to obtain spatially co-ordinated movements of different points of the structure.

Some examples of machines of this type are the mirrors of solar furnaces, the antennas of radio telescopes, the co-operating arms of a robot, the wheels of an electric vehicle, the trolleys for moving big rigid or flexible structures, the vibrating plates with six freedom grades, the ends of the legs of a walking vehicle, and so on.

All systems of this kind are provided with two or more servo mechanisms that, when they receive identical input commands, should furnish outputs in constant ratio with one another, regardless of the noise signals acting on their input and/or of any possible parametric variations.

A first well known solution to this problem provides for realising rigid mechanical connections between different points of the structure to be controlled, so as to constrain them in order to have the same behaviour in any case.

However, such a solution is not always exploitable due to obvious reasons, because it may well happen that the servo mechanisms to be controlled are largely spaced apart from one another, so that it would not be possible to realise an absolutely rigid mechanical connection therebetween.

A second well known solution, a very largely adopted solution, provides for realising servo mechanisms having high performance components, so as to reduce the sensitivity of the outputs of the concerned control systems in respect of the noise and of the parametric variations.

However, a solution of this kind has the noticeable disadvantage that it is rather expensive and additionally it does not guarantee that anyway all of the outputs have the same behaviour, regardless of the various noise signals and of the different parametric variations that may affect the behaviour of the individual control systems.

A control methodology (Invariance of Penalities) for systems of this kind is further known, which is based upon a mutual interconnection of the individual control systems of the individual servo mechanisms, in correspondence to the related error nodes.

Such a methodology allows obtaining a substantial identity of all outputs of the system (apart from the weights allotted to the coefficients of the feedback chains), but however it has the drawback that it requires anyway the realisation of complex circuits and devices, the more so when the number of servo mechanisms is increased and when the material distance between the concerned servo mechanisms is large.

Furthermore, the systems of this kind are such that all of the servo mechanisms receive an identical input signal.

It is an object of this invention to suggest a solution to the above mentioned problems based upon a single-input multi-output control system comprising two or more control sub-systems, each of said two or more control sub-systems having a corresponding error node and an output coincident with one of said multiple outputs, characterised in that said control systems comprises an auxiliary node, adapted to bi-directionally connect said error nodes with one another, the arrangement being such that, when noise signals and/or parametric variations are present, an equal distribution of said noise signals and/or parametric variations among said multiple outputs is obtained.

The main advantage of a control system according to this invention derives from the fact that it allows to equally distribute the effects of the noise and/or of the parametric variations possibly affecting the individual control systems among the outputs of the controlled system.

A second advantage derives from the fact that a system realised according to this invention does not include any mechanical connection between the points of the structure to be controlled and it furthermore makes it possible to avoid any wired cable electric connection between the individual mechanisms.

A third advantage of the control system according to this invention derives from the fact that all of the servo mechanisms included therein are supplied with a single input, applied to any one of said servo mechanisms. This noticeably simplifies the material realisation of the whole system, because it avoid any need to supply identical inputs to all utilised servo mechanisms.

A fourth advantage of the system according to this invention derives from the fact that it can be effectively obtained by utilising servo mechanisms realised with low cost and low performance control components and devices, without any functionality prejudice from the output identity view point.

Further advantages, characteristics and modes of use of this invention will be evident from the following detailed description of its preferred embodiments shown by way of illustration and not by way of limitation, with reference to enclosed drawings, wherein.

Figure 1:
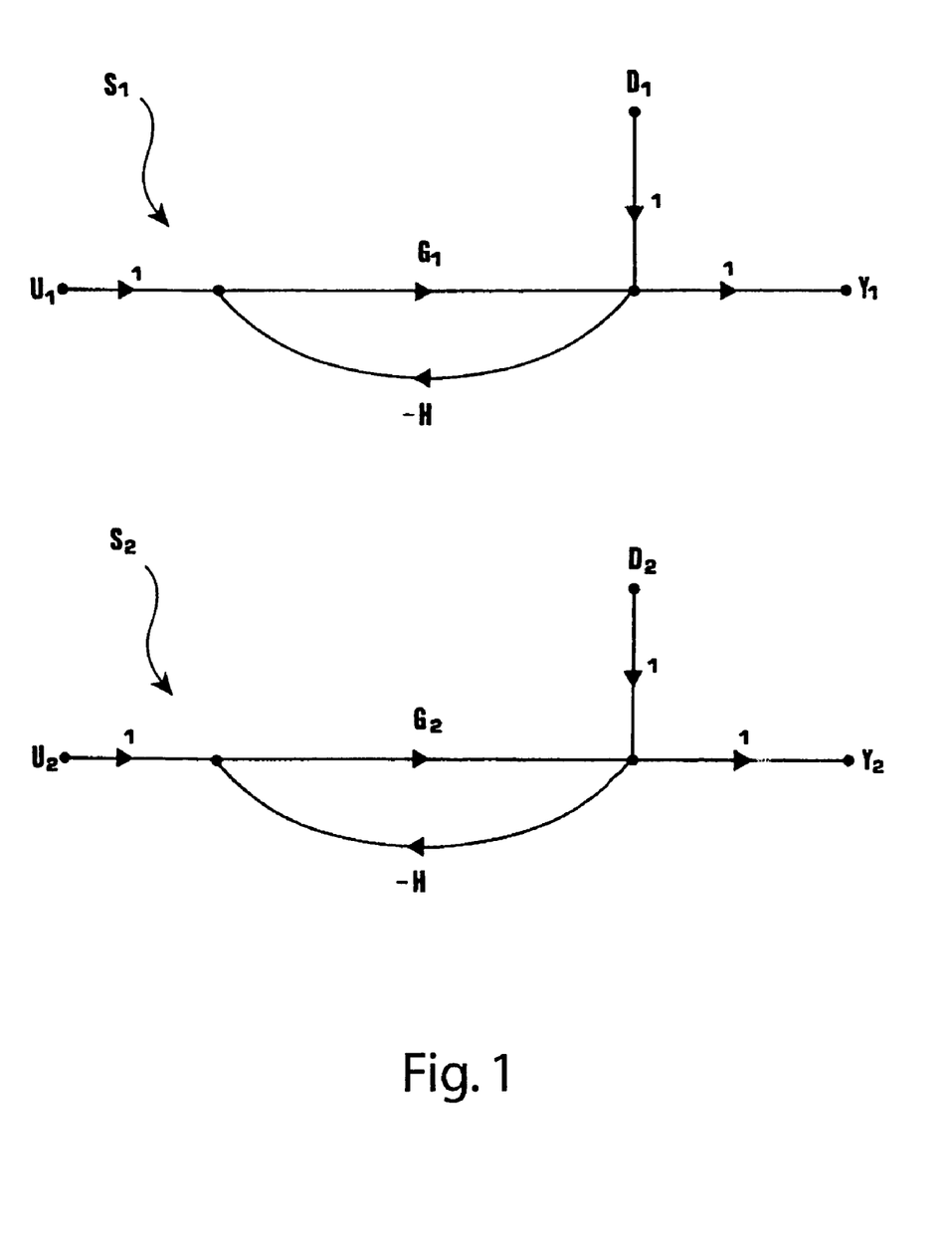
FIG. 1 is a diagram of a system comprising two servo mechanisms realised according to a first methodology of prior and usual art.

By referring firstly to FIG. 1, it shows a diagram of a system comprising two servo mechanisms and including two control sub-systems S1, S2 realised according to methodologies of the prior art.

For a system of this kind to be a system of SIMO (Single Input Multiple Output) type, namely a system having a single input and multiple outputs, it is necessary that $U_1=U_2=U$.

In this case, the outputs of the system can be written as follows:

$$Y_k = \frac{F_k}{1+F_k}\frac{U}{H} \qquad (1)$$

where $F_k=HG_k$ is the closed loop transfer function of the k-th system.

Consequently, the functions by which the sensitivity of output $Y_k$ with respect to the transfer function $G_k$ can be expressed as follows:

$$S_{G_k}^{Y_k} = \frac{1}{1+F_k} \forall k, S_{G_2}^{Y_1} = S_{G_1}^{Y_2} = 0 \qquad (2)$$

and the outputs $Y_{kh}$ relating to a noise signal $D_n$ acting on the output of the system are as follows:

$$Y_{kk} = \frac{1}{1+F_k} D_k, Y_{12} = 0, Y_{21} = 0. \qquad (3)$$

In all systems of this kind, even if the closed loop transfer functions $G_k$ appear to be identical with respect to one another, if it is desired to obtain $Y_1=Y_2$ under any conditions, it is necessary to realise sophisticated, very expensive and high performance servo mechanisms, even if they are not able to guarantee the obtainment of the desired result.

Subsequent FIGS. 2a to 2F show the input and the output graphs of the system of FIG. 1.

Figure 2A:
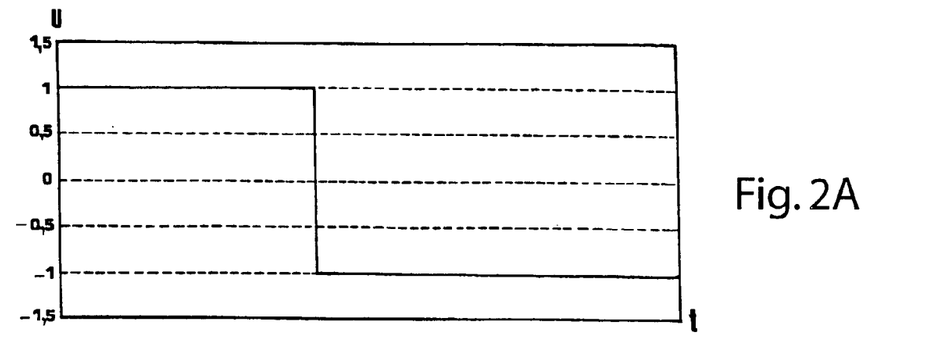
FIGS. 2A to 2F are graphs relating to the input and to the outputs of the system of FIG. 1.

In particular, FIG. 2A shows a step input U as applied to the two sub-systems S1, S2.

Figure 2B:
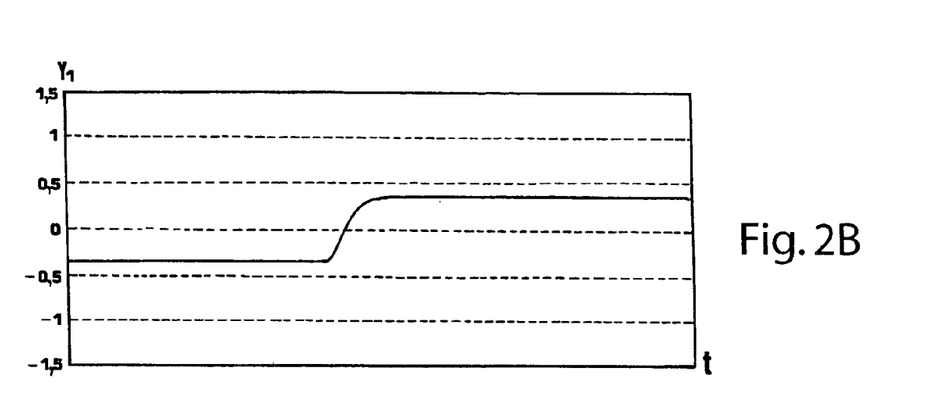
Figure 2C:
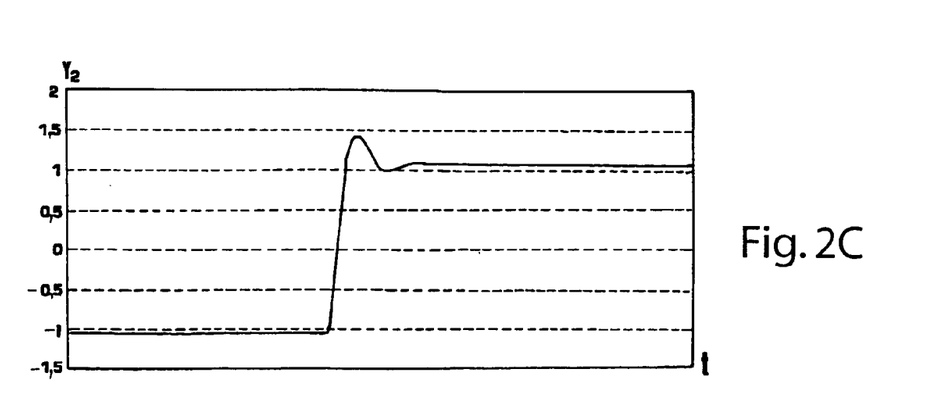

FIG. 2B shows the output signal $Y_1$ of sub-system S1, while FIG. 2C shows the output $Y_2$ of sub-system S2.

Figure 2D:
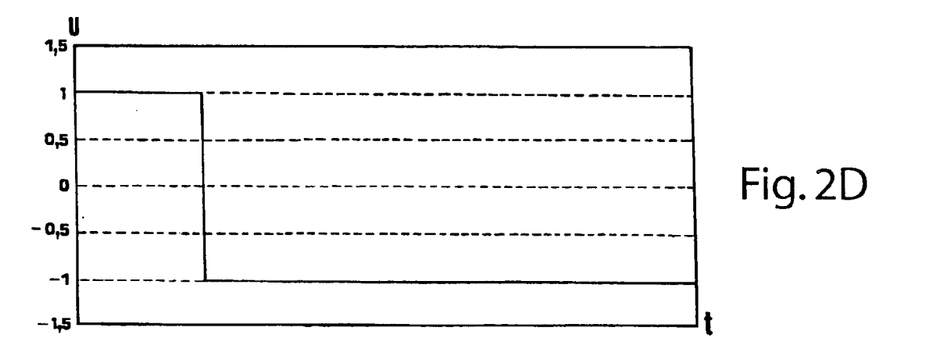

In similar way, FIG. 2D shows a step input U as applied to two servo mechanisms S1, S2 of a single SIMO system.

Figure 2E:
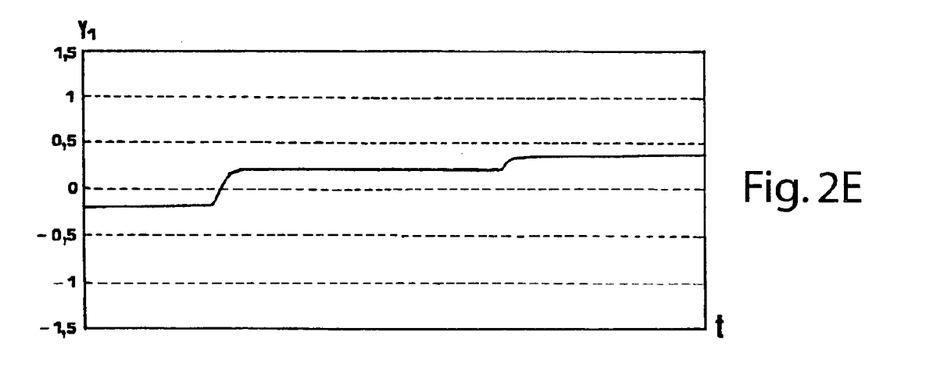
Figure 2F:
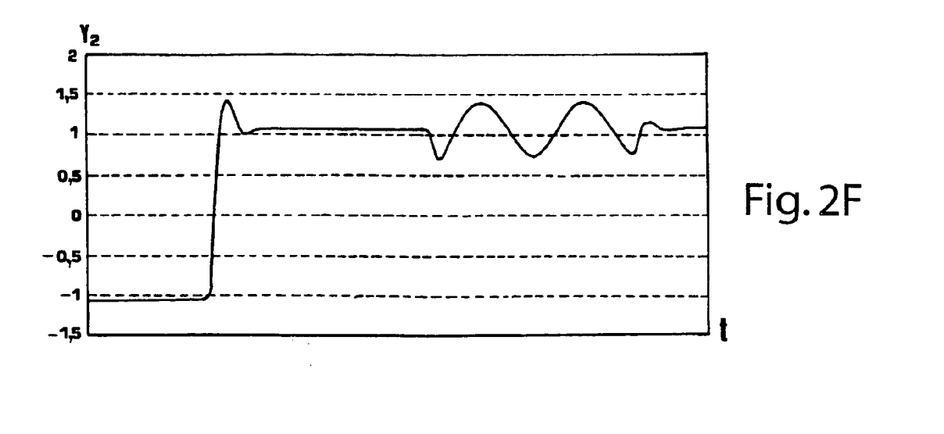

FIGS. 2E and 2F show the respective outputs $Y_1$, $Y_2$. FIG. 2E shows an output signal $Y_1$ of sub-system S1 which illustrates a variation occurring in the gain of the transfer function. FIG. 2F shows an output signal $Y_2$ of sub-system S2 which illustrates that a sinusoidal noise signal appears in the output signal.

Figure 3:
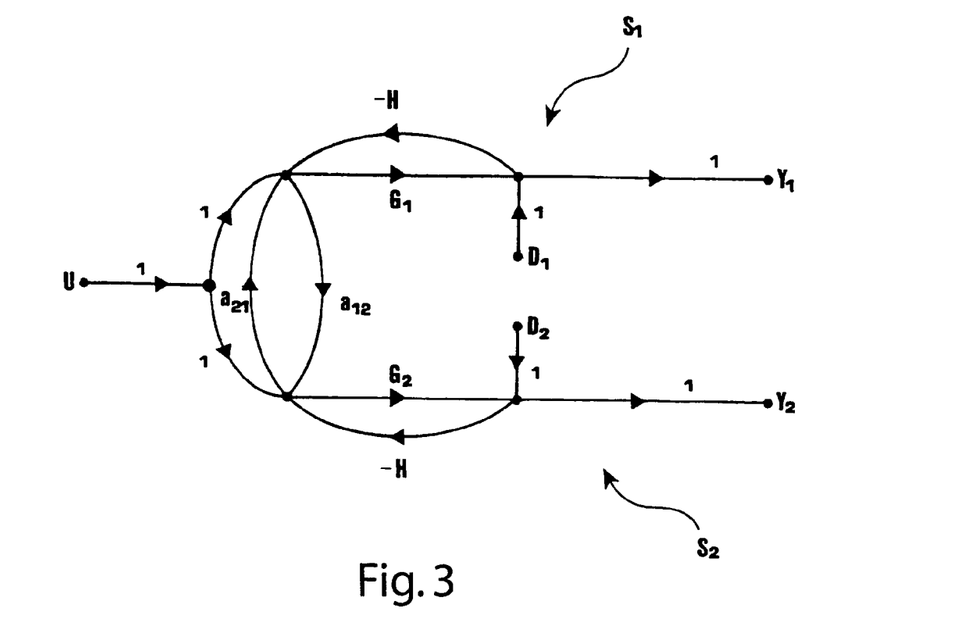
FIG. 3 is a diagram of a system comprising two servo mechanisms realised according to a second methodology of prior art.

Subsequent FIG. 3 shows a diagram of a system having one input U and two outputs $Y_1$ and $Y_2$, realised according a methodology of the prior art (Invariance of Penalities).

By setting the gain parameters $a_{12}=a_{21}=-1$, it can be easily calculated $$Y_1 = Y_2 = \Phi_2 \left( \frac{U}{H} + \frac{D_1}{F_1} + \frac{D_2}{F_2} \right) \qquad (4)$$

where $$\Phi_2 = \frac{1}{1 + \frac{1}{F_1} + \frac{1}{F_2}} \qquad (5)$$

It can be easily understood from equation (4) that the two outputs resulting from the input signal U and from the noise signals $D_1$ and $D_2$ are identical with respect to one another, regardless of the performances of the individual servo mechanisms.

Furthermore, it can be easily derived from equation (4) that $$S_{G_1}^{Y_1} = S_{G_2}^{Y_1} = S_{G_1}^{Y_2} = S_{G_2}^{Y_2}, \qquad (6)$$

which evidences that the performances relating to the two outputs are also identical to one another also in respect of the parametric variations occurring in the transfer functions.

As far as the meaning of $\Phi_2$ is concerned, only the connection between input U and the i-th output should be considered, for the sake of simplicity:

$$Y_i = \frac{1}{1 + \frac{1}{F_1} + \frac{1}{F_2}} \frac{U}{H_i}$$

When the above expression is compared to the output of a complementary system written in the following form $$Y = \frac{1}{1 + \frac{1}{F}} \frac{U}{H}$$

it can be noted that the sum $(1/F_1+1/F_2)$ replaces the term $1/F$ and the closed loop transfer function $\Phi_2$ of the system according to this invention is obtained by parallel combination $F_1 \| F_2$ of the closed loop transfer functions of the concerned two sub-systems.

However, it is necessary to underline that the expression of $Y_1$ is true only if $a_{12}*a_{21}=1$.

Anyway, often it practically occurs that $a_{12}*a_{21}=1+\epsilon$ with $\epsilon$ equal to a very small numerical amount.

Should $\epsilon$ be>0, it would be easy to ascertain that radicals having a positive real part are present in the transfer function $\Phi_2$ with consequent system instability.

On the contrary side, should $\epsilon$ be <0, it would be possible to utilise the $Y_i$ expression without substantial consequences to the performances of the comprehensive transfer function $\Phi_2$.

The up to now described methodology (Invariance of Penalities) can also be applied to the realisation of SIMO type systems having more than two servo mechanisms, with results similar to the previous ones and derivable from an extension of the same.

However, the exploitation of such methodology in respect of a system having N servo mechanisms entails the realisation of N(N−1) connections among the N servo mechanisms themselves.

It is apparent that, if N is a high number, then also N(N−1) represents a very high number of connections and this entails the realisation of complex circuits and devices, the more so when the distance between the servo mechanisms to be controlled is increased.

The embodiments of the control systems according to this invention, when systems having two servo mechanisms are involved, entails a complexity grade similar to the prior art, even if in such case the number of the necessary connections is increased.

As it will be hereinafter detailedly described, th use of a system according to this embodiment appears to be anyway more convenient when the number of servo mechanisms is equal or greater than three.

In a system of the third order, namely comprising three mechanisms, it is already more advantageous to utilise an embodiment according to this invention.

In this case, in fact, even if the number of the necessary connections between the error nodes of the system is unchanged, the number of signals exchanged between the error nodes themselves is decreased. This will be apparent in the following description.

Figure 4:
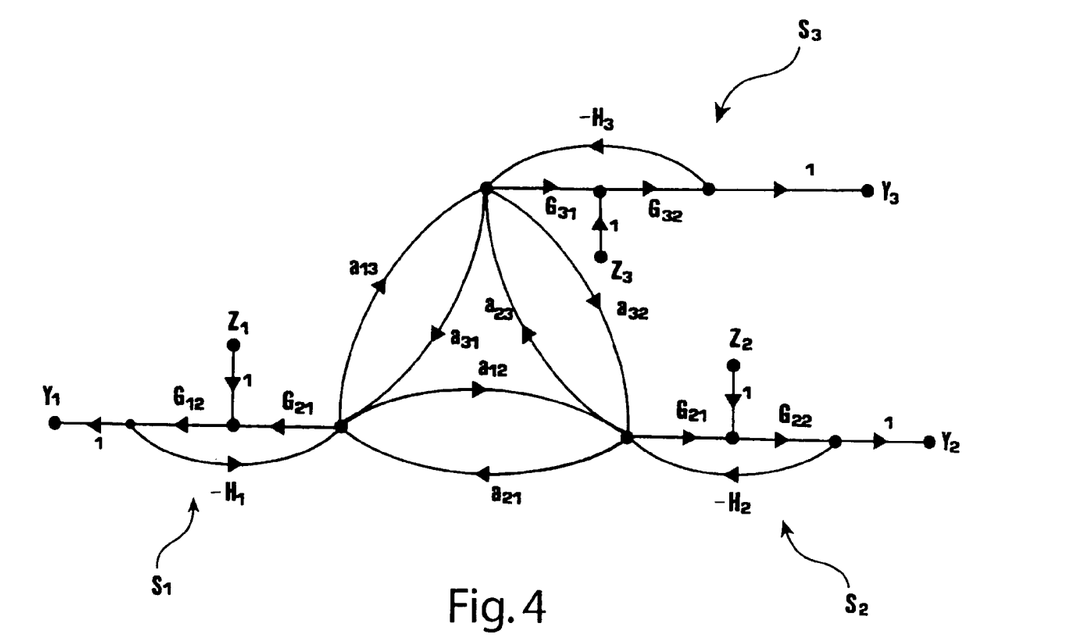
FIG. 4 is a broad diagram of a system comprising three servo mechanisms.

FIG. 4 shows a general diagram of a system realised according to the prior art (Invariance of Penalities) comprising three subsystems S1, S2, S3 corresponding, by way of exemplification, to three different servo mechanisms.

As regards such a system, it is obtained that $$\begin{cases} E_1 = -H_1Y_1 + a_{21}E_2 + a_{31}E_3 \\ E_2 = -H_2Y_2 + a_{12}E_1 + a_{32}E_3 \\ E_3 = -H_3Y_3 + a_{13}E_1 + a_{23}E_2 \end{cases} \quad (7)$$

that, in matricial form, can be written as $$A\ E = -HY \quad (8)$$

By setting $G_{11}+G_{12}=G_1$, $G_{21}+G_{22}=G_2$ and $G_{31}+G_{32}=G_3$ it can be obtained:

$$\begin{cases} Y_1 = G_1E_1 + G_{12}Z_1 \\ Y_2 = G_2E_2 + G_{22}Z_2 \\ Y_3 = G_3E_3 + G_{32}Z_3 \end{cases} \quad (9)$$

that, in matricial form, can be written as $$Y = GE + G''Z \quad (10)$$

By simple mathematical rearrangements, it can be obtained:

$$-H\ G''Z = [A + HG'G'']E = [A+F]E \quad (11)$$

$$Y = \{I - G[A+F]^{-1}H\}G''Z \quad (12)$$

In this case:

$$[A+F]^{-1} = \frac{adj[A+F]}{\Delta_3}. \quad (13)$$

where $$\Delta_3 = \begin{vmatrix} 1+F_1 & -a_{21} & -a_{31} \\ -a_{12} & 1+F_2 & -a_{32} \\ -a_{13} & -a_{23} & 1+F_3 \end{vmatrix} = \quad (14)$$

$$= F_1F_2 + F_3F_1 + F_3F_2 + F_1F_2F_3 +$$
$$-(a_{13}a_{21}a_{32} + 1 + 1 + a_{23}a_{12}a_{31}).$$

By setting again all coefficients $a_{ik}=a_{ki}=-1$ for each i and k, it is obtained that $$\Delta'_3 = F_1F_2 + F_1F_3 + F_2F_3 + F_1F_2F_3. \quad (15)$$

The added matrix of equation (13) can be written as $$adj[A+F] = \begin{bmatrix} F_2+F_2+F_2F_3 & -F_3 & -F_2 \\ -F_3 & F_1+F_3F_1F_3 & -F_1 \\ -F_2 & -F_1 & F_1+F_2+F_1F_2 \end{bmatrix} \quad (16)$$

Furthermore:

$$I - G[A+F]^{-1}H = \frac{1}{\Delta'_3}\begin{bmatrix} F_2F_3 & G_1H_2F_3 & G_1H_3F_2 \\ G_2H_1F_3 & F_1F_3 & G_2H_3F_1 \\ G_3H_1F_2 & G_3H_2F_1 & F_1F_2 \end{bmatrix} \quad (17)$$

When equation (17) is substituted into equation (12), matrix Y of the systems outputs can be written as follows:

$$Y = \frac{1}{\Delta'_3}\begin{bmatrix} G_{12}F_2F_3 & G_{22}G_1H_2F_3 & G_{32}G_1H_3F_2 \\ G_{12}G_2H_1F_3 & G_{22}F_1F_3 & G_{32}G_2H_3F_1 \\ G_{12}G_3H_1F_2 & G_{22}G_3H_2F_1 & G_{32}F_1F_2 \end{bmatrix} Z \quad (18)$$

By setting:

$$\Phi_3 = \frac{1}{1+\frac{1}{F_1}+\frac{1}{F_2}+\frac{1}{F_3}} = \frac{F_1\|F_2\|F_3}{1+F_1\|F_2\|F_3}$$

the system outputs due to inputs $Z_k$ assume the following form:

$$\begin{cases} Y_1 = \Phi_3\left(\frac{Z_1}{G_{11}H_1} + \frac{Z_2}{G_{21}H_1} + \frac{Z_3}{G_{31}H_1}\right) \\ Y_2 = \Phi_3\left(\frac{Z_1}{G_{11}H_2} + \frac{Z_2}{G_{21}H_2} + \frac{Z_3}{G_{31}H_2}\right) \\ Y_3 = \Phi_3\left(\frac{Z_1}{G_{11}H_3} + \frac{Z_2}{G_{21}H_3} + \frac{Z_3}{G_{31}H_3}\right) \end{cases}$$

Since $$a_{12} = a_{21} = a_{13} = a_{31} = a_{23} = a_{32} = -1 \quad (21)$$

it can be obtained:

$$Y_1H_1 = Y_2H_2 = Y_3H_3 = \Phi_3\left(\frac{Z_1}{G_{11}} + \frac{Z_2}{G_{21}} + \frac{Z_3}{G_{31}}\right). \quad (22)$$

Figure 5:
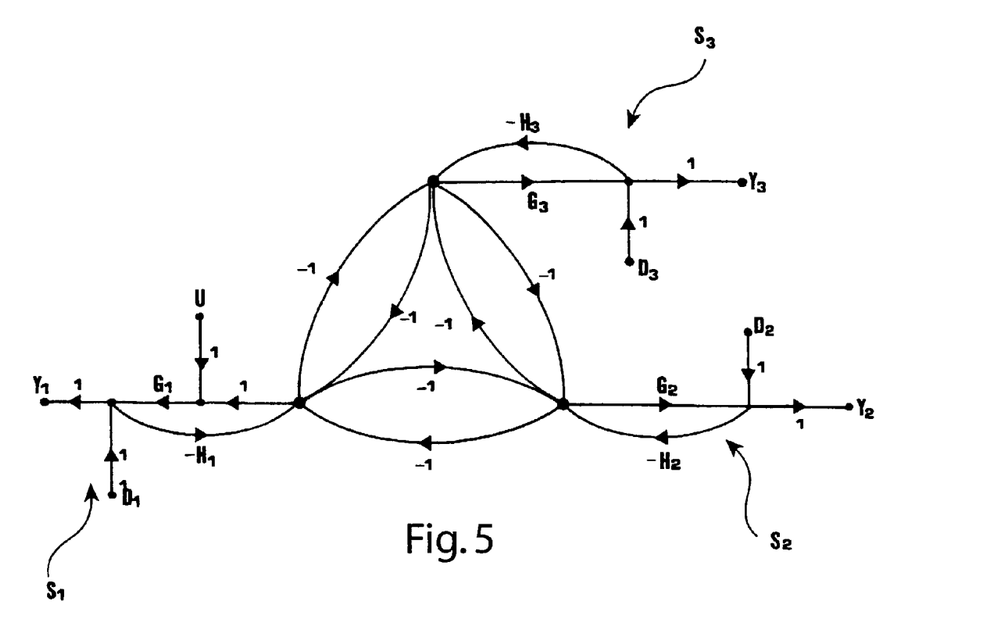
FIG. 5 is a diagram of the system of FIG. 4 in a particular case.

The subsequent FIG. 5 is a diagram of the system of FIG. 4 in which, according to this invention, the following settings have been adopted: $U_1=U$, $U_2=0$ and $U_3=0$.

Furthermore, the presence of noise signals $D_1$, $D_2$, $D_3$ has been assumed on the outputs of the sub-systems S1, S2, S3.

By selecting the gain coefficients $a_{ik}$ according to equation (21) and by setting $$G_{11}=G_{21}=G_{31}=1 \quad (23)$$

and $$G_{12}=G_1,\ G_{22}=G_2,\ G_{32}=G_3 \quad (24)$$

into the general expression of $F_1$, $F_2$, $F_3$, equation (22) furnishes, as far as the outputs due to the input:

$$Y_{u1}H_1 = Y_{u2}H_2 = Y_{u3}H_3 = \Phi_3 U \quad (25)$$

The three outputs due to the noise signals $D_1$, $D_2$, $D_3$ can be derived from equation (22)

$$G_{12}=G_{22}=G_{33}=1 \quad (26)$$

and $$G_{11}=G_1, G_{21}=G_2, G_{31}=G_3, \quad (27)$$

so as to obtain:

$$Y_{d1}H_2 = Y_{d2}H_2 = Y_{d3}H_3 = \Phi_3\left(\frac{D_1}{G_1} + \frac{D_2}{G_2} + \frac{D_3}{G_3}\right) \quad (28)$$

By setting again $H_1=H_2=H_3=H$, it can be obtained:

$$Y_1 = Y_2 = Y_3 = \frac{\Phi_3}{H}\left(U + \frac{D_1}{G_1} + \frac{D_2}{G_2} + \frac{D_3}{G_3}\right) \quad (29)$$

This equation evidences that, in a system according to this invention, having a single input U and a different noise signal $D_i$ acting upon each output, the effects of the input signal and of the three noise signals affect in identical manner the three outputs.

By additionally considering the expression (19) relating to the comprehensive transfer function, it is easy to ascertain that the three outputs $Y_1$, $Y_2$ and $Y_3$ remain equal to one another regardless of any parametric variations in $G_1$ and/or $G_2$ and/or $G_3$.

Again according to this invention, the system of FIG. 5 can be advantageously realised according to the diagram illustrated in the following FIG. 6.

In this case, an auxiliary node Nc has been introduced for co-operation among error nodes $Ne_i$.

The variable associated to said auxiliary node Nc is furnished by:

$$C = \sum_{i=1}^{3} \alpha_i E_i \quad (33)$$

in which $\alpha=\pm 1$, depending on the circumstances.

Variable C is obtained by co-operation of all variables $E_i$ each provided with its own sign.

By suitably selecting $\beta=\pm 1$ and $\gamma=\pm 1$, equation (33) can easily be transformed as follows:

$$\begin{cases} E_1 = -H_1 Y_1 + \beta_1 C + \gamma_1 E_1 \\ E_2 = -H_2 Y_2 + \beta_2 C + \gamma_2 E_2 \\ E_3 = -H_3 Y_3 + \beta_3 C + \gamma_3 E_3 \end{cases} \quad (34)$$

When equation (33) is substituted into equation (34), it can be obtained:

$$\begin{cases} E_1 = -H_1 Y_1 + \alpha_1\beta_1 E_1 + \alpha_1\beta_2 E_2 + \alpha_1\beta_3 E_3 + \gamma_1 E_1 \\ E_2 = -H_2 Y_2 + \alpha_2\beta_1 E_1 + \alpha_2\beta_2 E_2 + \alpha_2\beta_3 E_3 + \gamma_2 E_2 \\ E_3 = -H_3 Y_3 + \alpha_3\beta_1 E_1 + \alpha_3\beta_2 E_2 + \alpha_3\beta_3 E_3 + \gamma_3 E_3 \end{cases} \quad (35)$$

which are expressions analogous to the expressions for the system related to the previous case.

By setting $\alpha_i * \beta_i = \gamma_i$, it can be obtained:

$$\begin{cases} E_1 = -H_1 Y_1 + \alpha_1\beta_2 E_2 + \alpha_1\beta_3 E_3 \\ E_2 = -H_2 Y_2 + \alpha_2\beta_1 E_1 + \alpha_2\beta_3 E_3 \\ E_3 = -H_3 Y_3 + \alpha_3\beta_1 E_1 + \alpha_3\beta_2 E_2 \end{cases} \quad (36)$$

It is possible to ascertain now that, depending on the selection of the coefficients, different signs can be obtained for the three outputs, even if the three outputs are equal or proportional to one another in respect of their absolute value.

For instance, when it is necessary to obtain a k-th output with opposite sign with respect to the other two outputs, it will be necessary to change the sign of the connection coefficients between the k-th node and the auxiliary node.

Figure 6:
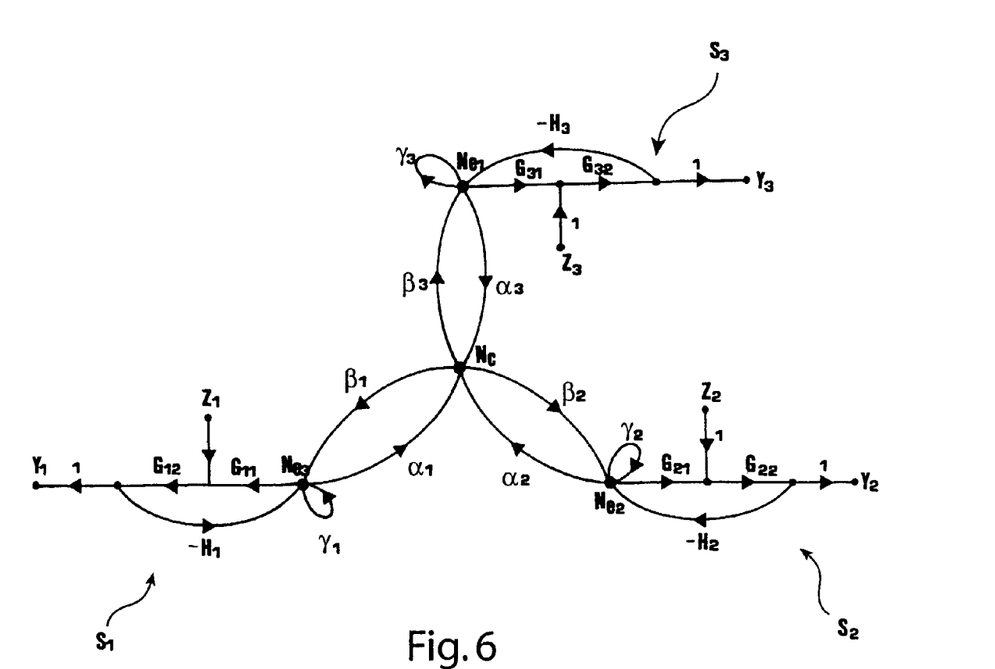
FIG. 6 is a diagram of a control system according to this invention comprising three servo mechanisms.
Figure 7A:
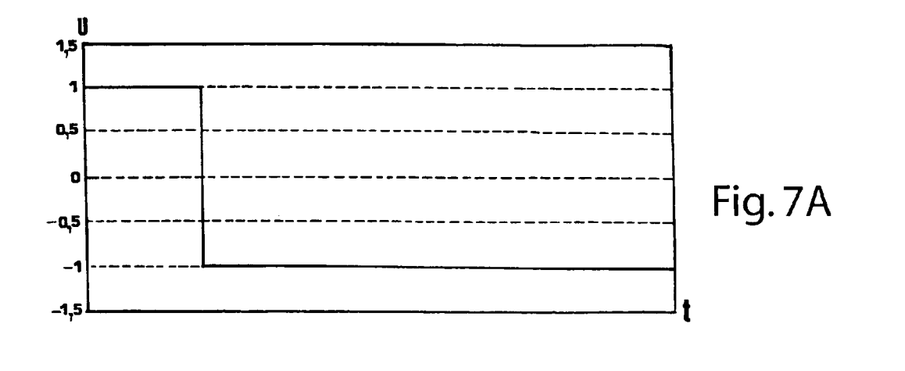
FIGS. 7A to 7D are graphs relating to the input and to the outputs of the system of FIG. 6.
Figure 7B:
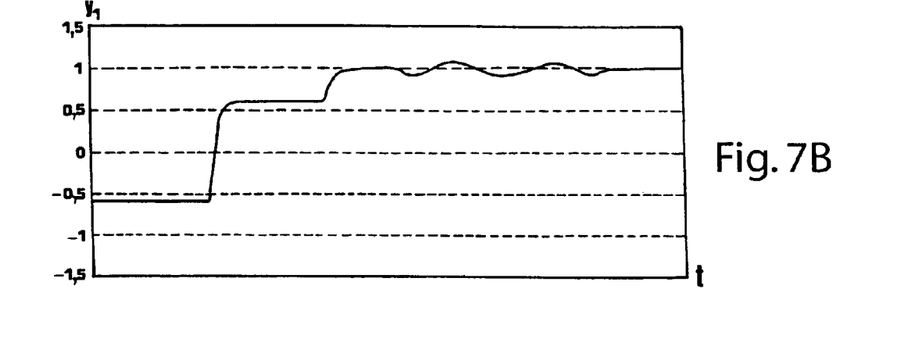
Figure 7C:
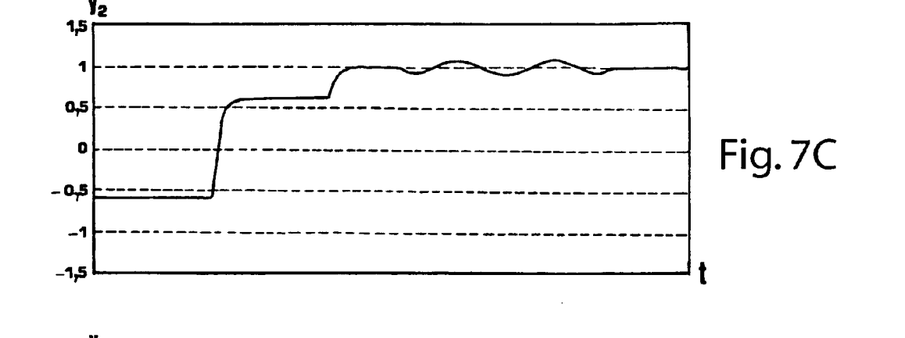
Figure 7D:
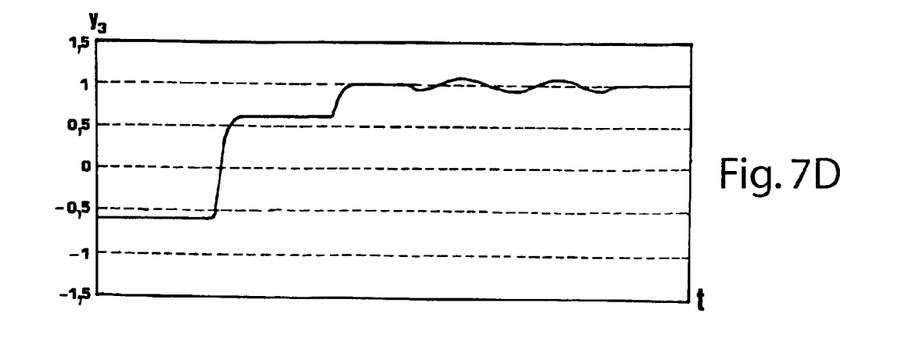

FIGS. 7A to 7D illustrate graphs relating to the input U and the outputs $Y_1$, $Y_2$ and $Y_3$ of the system of FIG. 6, when a noise signal applied to the system S2 and a parametric variation applied to system S3 are present.

The above Figures evidence the result obtained by means of this invention, namely the possibility to obtain an equal distribution of any noise signals as well as of any parametric variations to all of the outputs of the system, without the need to make recourse to sophisticated and expensive devices.

Lastly, the submitted observations and the up to now described mathematical arrangements can be extended to the case of a system comprising N servo mechanisms to be controlled.

The mathematical arrangements relating to a case of this type will be now omitted for the sake of description simplicity, since they are well known to those skilled in the art.

Figure 8:
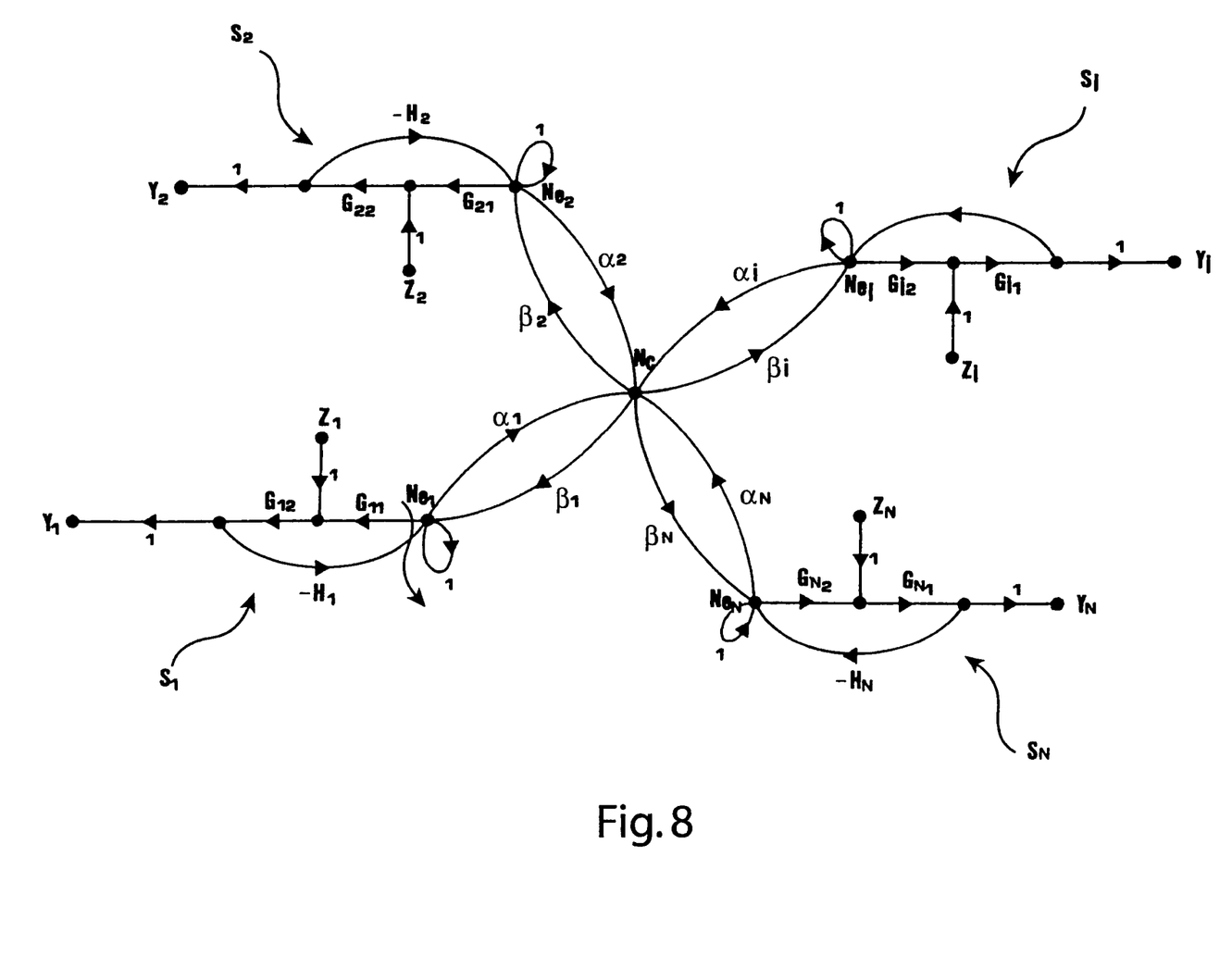
FIG. 8 is a broad diagram of a system according to this invention comprising N servo mechanisms.

By referring to FIG. 8, we can write:

$$C = \sum_{i=1}^{N} \alpha_i E_i \quad (37')$$

$$E_k = -H_k Y_k + \beta_k C + E_k \ \forall k = 1, \ldots, N \quad (37'')$$

$$Y_k = G_k E_k + G_{k2} Z_k \ \forall k = 1, \ldots, N. \quad (37''')$$

By selecting $\alpha_i=1$ and $\beta_i=-1$, it can be obtained:

$$Y_k H_k = \Phi_N \sum_{i=1}^{N} \frac{Z_i}{G_{i1}} \ \forall k = 1, \ldots, N \quad (38)$$

in which $$\Phi_N = \frac{1}{1 + \sum_{i=1}^{N} \frac{1}{F_i}} \quad (39)$$

It can be derived from the above that $$S_{W_i}^{Y_k} = const \ \forall i, k = 1, \ldots, N. \quad (40)$$

By referring to a system having a single input U applied to one of the servo mechanisms and N noise signals $D_i$ acting on the N outputs, it can be obtained:

$$Y_k H_k = \Phi_N \left( U + \sum_{i=1}^{N} \frac{D_i}{G_i} \right) \quad (41)$$

Also in this case, when it is desired to obtain outputs with different signs with respect to one another, it will be sufficient to correspondingly change the signs of the coefficients.

By setting $H_k = H$ for each k, it can be obtained:

$$Y_k = \Phi_N \left( \frac{U}{H} + \sum_{i=1}^{N} \frac{D_i}{F_i} \right) \quad (42)$$

It should be further remarked that $$E_k = U - Y_k H_k = U - \Phi_N U = U - \frac{F\|}{1 + F\|} U = \frac{1}{1 + F\|} U \quad (44)$$

in which, according to the symbology as up to now adopted:

$$F\| = F_1 \| F_2 \| \ldots F_N, \quad (43)$$

It can be easily ascertained that if, in steady state conditions, it is desired to obtain $E_k = 0$ when a step signal U is applied to the input, it is necessary that all transfer function $F_k$ have at least a pole at the origin.

It can be easily noted that, when a co-operation auxiliary node Nc is utilised, the necessary number of connections is 2N, where N is the number of sub-systems, while the number of signals to be transmitted is equal to N+1.

In contrast, when direct connections are realised between the error nodes (prior art), the necessary number of connections is N(N−1), equal to the number of signals to be transmitted.

This evidences the noticeable advantage deriving from the use of systems according to this invention, the more so when systems of an order equal to or higher than three are involved.

In particular, the return signal from the auxiliary node Nc to the error nodes is the same for all of the three error nodes and this results of course into a higher realisation simplicity for the system.

Let us consider, in fact, the case in which the signals are transmitted by means of wireless systems: it will be sufficient to transmit a single signal by means of a single transmitter from node C and all error nodes will receive it in the same way.

Such an advantage becomes of course more relevant as the number of servo mechanisms and as their distances increase.

Particular attention is to be dedicated to the realisation of the positive reactions equal to +1 on the error nodes.

In fact, aiming at avoiding that the system become unstable, it is necessary that the signals coming from the auxiliary node as well as the corresponding reaction signals be available at the same time.

Anyway, by selecting $|\beta_k| = \gamma_k = 1 - \epsilon$, with $\epsilon$ sufficiently small, the possible unstability can be easily avoided without jeopardising the behaviour of the system in its whole.

This invention has been up to now described according to its preferred embodiments by way of illustration, but not by way of limitation. It should be understood that other embodiments are possible all of which are to be considered as falling within the scope of this invention as defined by the attached claims.

The invention claimed is:

1. A single-input multi-output control system comprising two or more control sub-systems, each of said two or more control sub-systems having a corresponding error node ($Ne_i$) and an output ($Y_i$) coincident with one of said multiple outputs, characterised in that said control systems comprises an auxiliary node (Nc), adapted to bi-directionally connect said error nodes ($Ne_i$) with one another, the arrangement being such that, when noise signals and/or parametric variations are present, an equal distribution of said noise signals and/or parametric variations among said multiple outputs is obtained.

2. The system according to claim 1, wherein said single input is applied as input to any one of said two or more control sub-systems.

3. The system according to claim 2, wherein a quantity (C) corresponds to said auxiliary node (Nc) and an error quantity ($E_i$) corresponds to each of said error nodes ($Ne_i$), said quantity (C) being the algebraic sum of said quantities ($E_k$).

4. The systems according to claim 3, wherein a gain parameter corresponds to each of said connections between said auxiliary node (Nc) and one of said error nodes ($Ne_i$).

5. The system according to claim 4, wherein at least one of said gain parameters has a value equal to 1.

6. The system according to claim 4 wherein at least one of said gain parameters has a value equal to −1.

7. The systems according to claim 2, wherein a gain parameter corresponds to each of said connections between said auxiliary node (Nc) and one of said error nodes ($Ne_i$).

8. The system according to claim 7, wherein at least one of said gain parameters has a value equal to 1.

9. The system according to claim 7, wherein at least one of said gain parameters has a value equal to −1.

10. The systems according to claim 2, wherein each of said two or more control sub-systems is of a feedback type, having a closed loop transfer function.

11. The system according to claim 1, wherein a quantity (C) corresponds to said auxiliary node (Nc) and an error quantity ($E_i$) corresponds to each of said error nodes ($Ne_i$), said quantity (C) being the algebraic sum of said quantities ($E_k$).

12. The systems according to claim 11, wherein a gain parameter corresponds to each of said connections between said auxiliary node (Nc) and one of said error nodes ($Ne_i$).

13. The system according to claim 12, wherein at least one of said gain parameters has a value equal to 1.

14. The system according to claim 12, wherein at least one of said gain parameters has a value equal to −1.

15. The systems according to claim 11, wherein each of said two or more control sub-systems is of a feedback type, having a closed loop transfer function.

16. The systems according to claim 1, wherein a gain parameter corresponds to each of said connections between said auxiliary node (Nc) and one of said error nodes ($Ne_i$).

17. The system according to claim 16, wherein at least one of said gain parameters has a value equal to 1.

18. The system according to claim 17, wherein at least one of said gain parameters has a value equal to −1.

19. The systems according to claim 16, wherein each of said two or more control sub-systems is of a feedback type, having a closed loop transfer function.

20. The systems according to claim 1, wherein each of said two or more control sub-systems is of a feedback type, having a closed loop transfer function.

* * * * *